United States Patent
Cortes et al.

(10) Patent No.: US 10,538,074 B2
(45) Date of Patent: *Jan. 21, 2020

(54) PROCESSING SLICE DATA

(71) Applicant: HEWLETT-PACKARD DEVELOPMENT COMPANY, L.P., Houston, TX (US)

(72) Inventors: Sebastia Cortes, Barcelona (ES); Alejandro Manuel De Pena, Sant Cugat del Valles (ES); Josep Giralt, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 541 days.

This patent is subject to a terminal disclaimer.

(21) Appl. No.: 15/111,127

(22) PCT Filed: Jul. 31, 2014

(86) PCT No.: PCT/EP2014/066546
§ 371 (c)(1),
(2) Date: Jul. 12, 2016

(87) PCT Pub. No.: WO2015/106840
PCT Pub. Date: Jul. 23, 2015

(65) Prior Publication Data
US 2016/0349724 A1    Dec. 1, 2016

(30) Foreign Application Priority Data

Jan. 16, 2014 (WO) ............... PCT/EP2014/050841
Apr. 30, 2014 (WO) ............... PCT/EP2014/058822

(51) Int. Cl.
*B33Y 50/02*     (2015.01)
*B29K 105/00*    (2006.01)

(52) U.S. Cl.
CPC ........ *B33Y 50/02* (2014.12); *B29K 2105/251* (2013.01); *G05B 2219/49023* (2013.01)

(58) Field of Classification Search
CPC .. G05B 17/02; G05B 19/406; B29C 67/0081; B29C 67/0088; B29C 67/0092
See application file for complete search history.

(56) References Cited

U.S. PATENT DOCUMENTS 6,799,959 B1    10/2004    Tochimoto et al.
7,790,096 B2    9/2010    Merot et al.
(Continued)

FOREIGN PATENT DOCUMENTS

DE    102012221218 A1    5/2013
EP    0338751    * 10/1989
(Continued)

OTHER PUBLICATIONS

Lin, S.L. et al; Fabrication and Analysis of Three-dimensional Object Using Layerwise Manufacturing Technology; IEEE; Apr. 7-10, 2013; pp. 783-766.

*Primary Examiner* — Vincent H Tran
(74) *Attorney, Agent, or Firm* — HP Inc. Patent Department

(57) ABSTRACT

A system is provided for processing slice data representing a slice of a three-dimensional object to be generated by an additive manufacturing system. The system includes a processor to perform, when the additive manufacturing system is to generate the slice, a transformation on the slice data based on characteristic data of the additive manufacturing system, the slice data derived from three-dimensional object design data.

19 Claims, 5 Drawing Sheets

(56) References Cited

U.S. PATENT DOCUMENTS

| | | | |
|---|---|---|---|
| 10,137,644 B2* | 11/2018 | de Pena | G05B 19/4099 |
| 2004/0251581 A1 | 12/2004 | Jang et al. | |
| 2009/0174709 A1* | 7/2009 | Kozlak | G06F 17/50 |
| | | | 345/420 |
| 2009/0206065 A1 | 8/2009 | Kruth et al. | |
| 2013/0102103 A1* | 4/2013 | Cellere | H01L 31/022425 |
| | | | 438/61 |
| 2013/0327917 A1 | 12/2013 | Steiner | |
| 2014/0070461 A1* | 3/2014 | Pax | B33Y 50/02 |
| | | | 264/401 |
| 2014/0309764 A1* | 10/2014 | Socha-Leialoha | H04N 13/239 |
| | | | 700/119 |
| 2015/0004046 A1* | 1/2015 | Graham | G06T 19/00 |
| | | | 419/53 |
| 2015/0026650 A1* | 1/2015 | Yeric | G06F 17/5081 |
| | | | 716/52 |
| 2015/0061170 A1* | 3/2015 | Engel | B33Y 10/00 |
| | | | 264/40.1 |
| 2015/0273767 A1* | 10/2015 | Batchelder | G03G 15/224 |
| | | | 264/401 |
| 2016/0082666 A1* | 3/2016 | de Pena | G05B 19/4099 |
| | | | 700/98 |

FOREIGN PATENT DOCUMENTS

| | | |
|---|---|---|
| EP | 1170115 A2 | 1/2002 |
| EP | 1452298 A1 | 9/2004 |
| WO | WO-2006091842 A1 | 8/2006 |
| WO | WO-2014074947 A2 | 5/2012 |
| WO | WO-2013030064 A1 | 3/2013 |

\* cited by examiner

PROCESSING SLICE DATA

RELATED APPLICATIONS

This application claims priority to PCT Application No. PCT/EP2014/058822 filed on Apr. 30, 2014, entitled "PROCESSING OBJECT DATA", the entire contents of which are hereby incorporated herein by reference, and which itself claims priority to PCT Application No. PCT/EP2014/050841 filed on Jan. 16, 2014, entitled "GENERATING A THREE-DIMENSIONAL OBJECT", the entire contents of which are hereby incorporated herein by reference.

BACKGROUND

Additive manufacturing systems that generate three-dimensional objects on a layer-by-layer basis have been proposed as a convenient way to produce three-dimensional objects.

An object to be generated may be represented digitally, for example in a suitable computer-aided design (CAD) format. The digital representation of an object to be generated may be processed before being provided to an additive manufacturing system to generate the object.

BRIEF DESCRIPTION

Some examples are described with respect to the following figures.

Figure 2A:
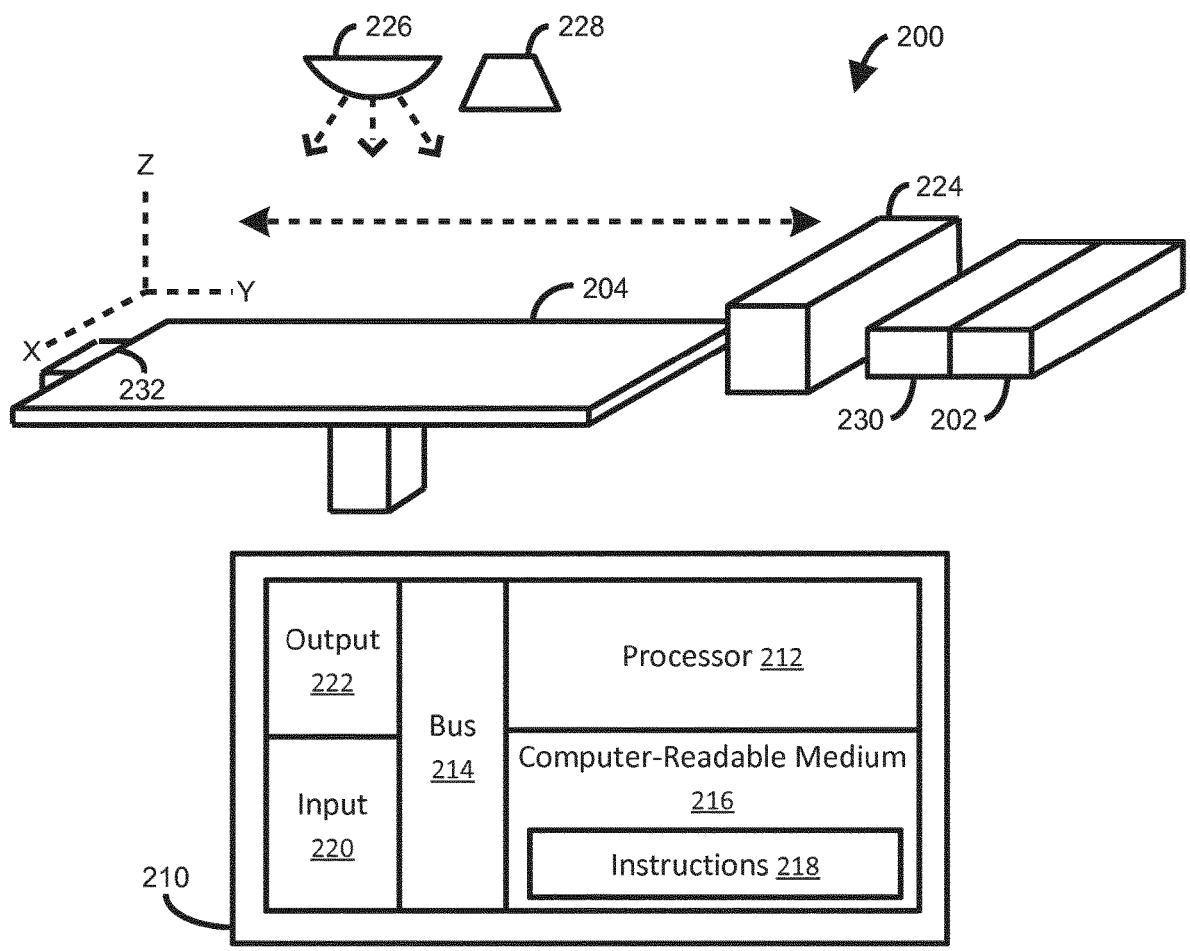
FIG. 2a is a simplified isometric illustration of an additive manufacturing system according to some examples.
Figure 2B:
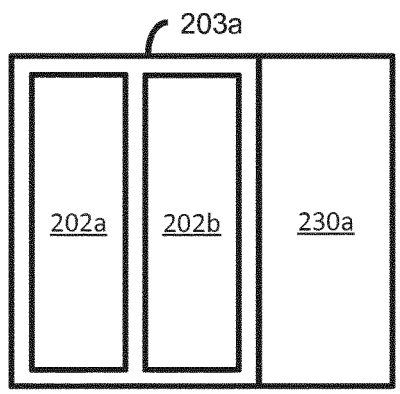
Figure 2C:
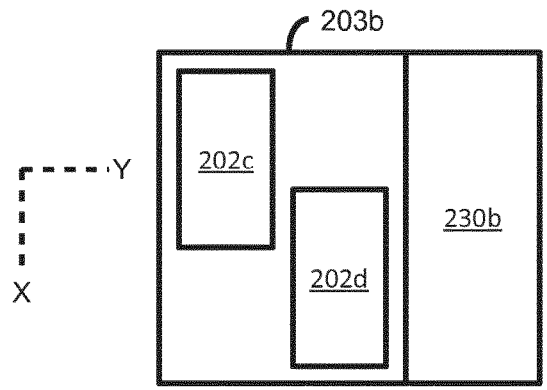
Figure 3:
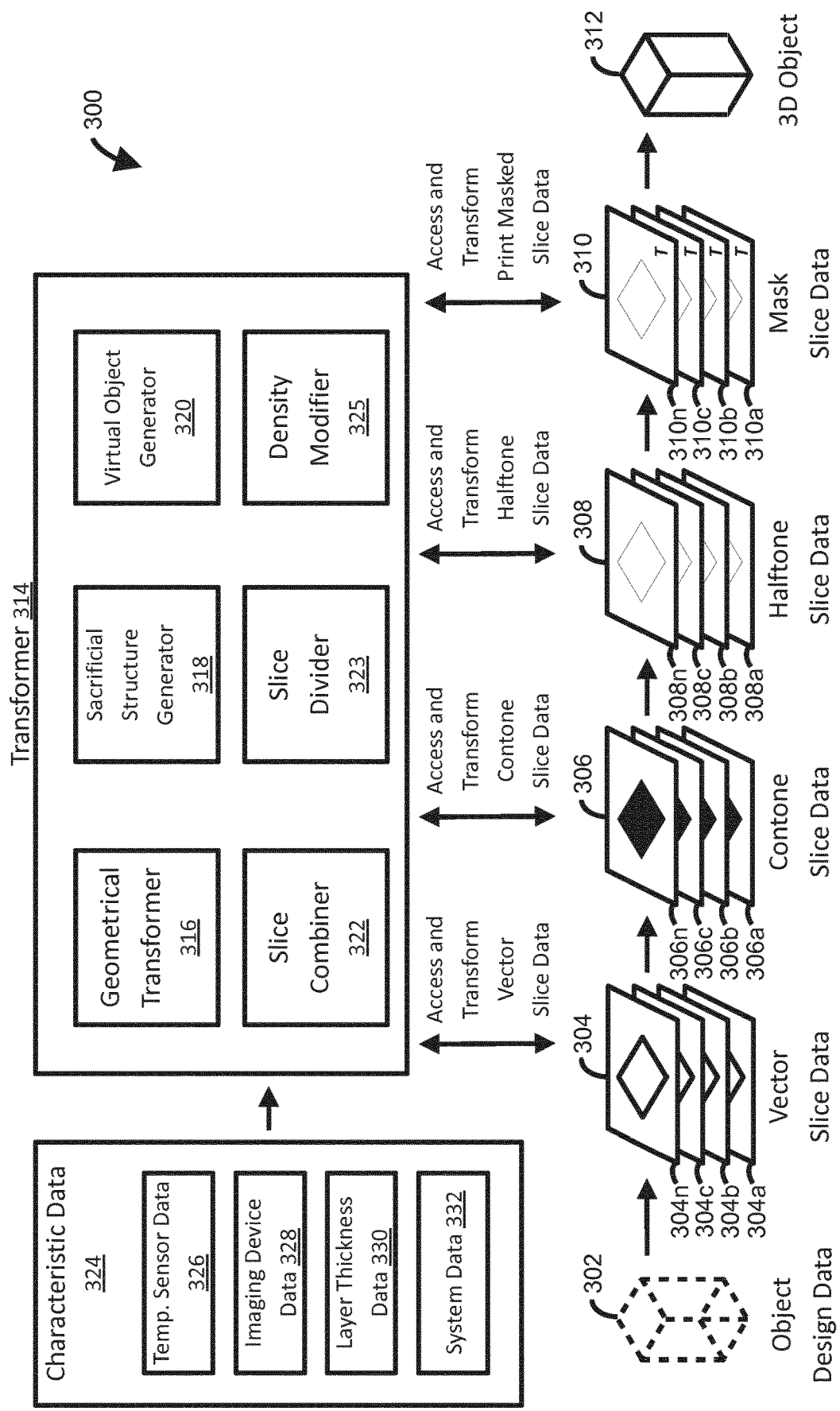
Figure 4:
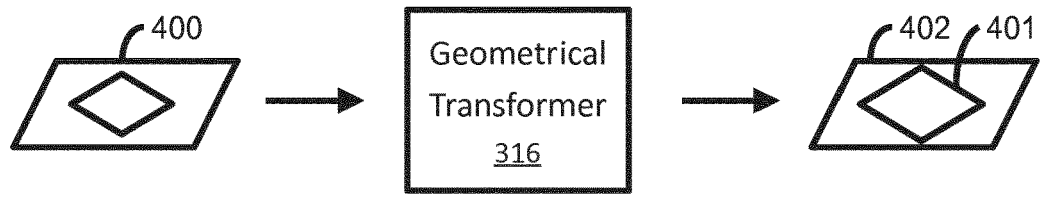
Figure 5:
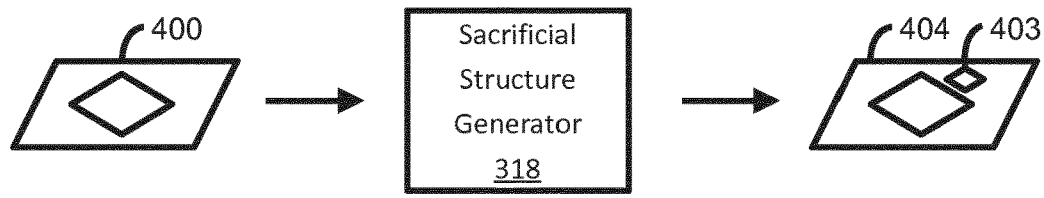
Figure 6:
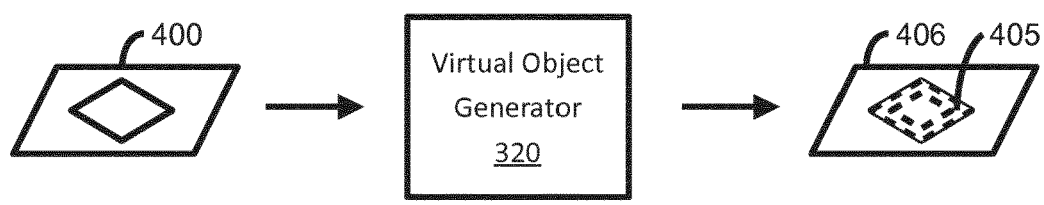
Figure 7:
Figure 8:
Figure 9:
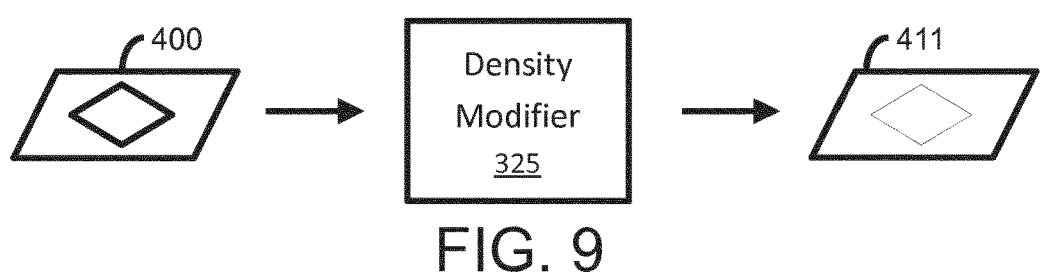
Figure 10:
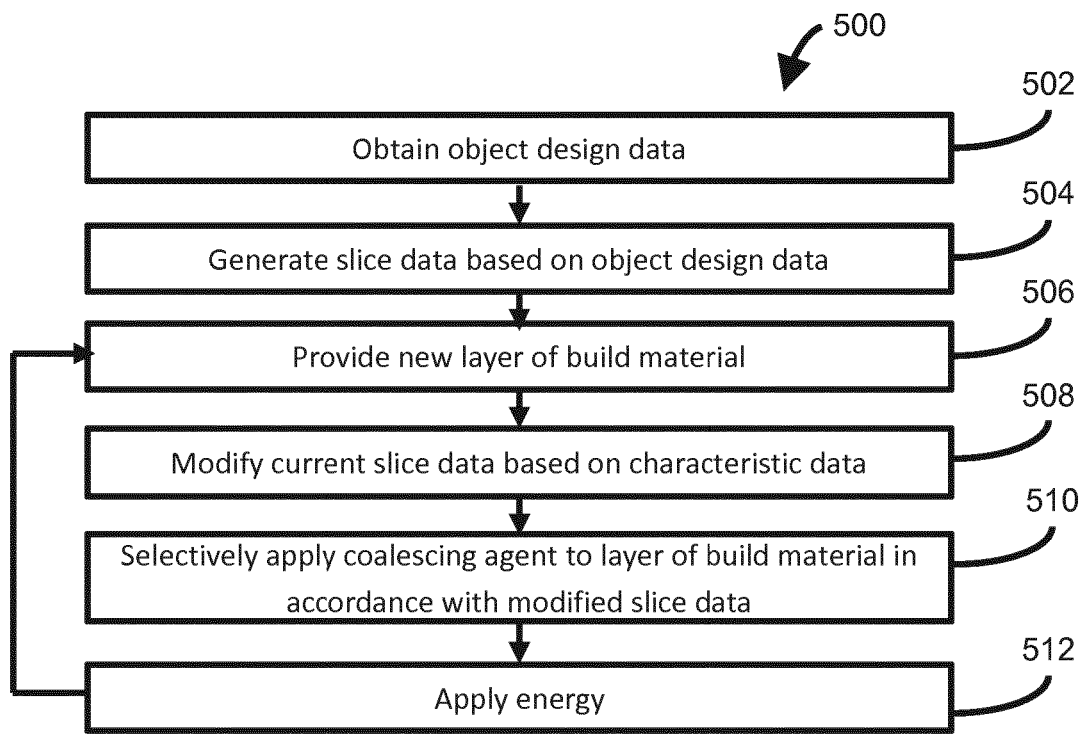

FIGS. 2b-c are simplified schematic top views of agent distributors and imaging devices mounted on moveable carriages according to some examples;

FIG. 3 illustrates a block diagram of a data processing pipeline according to some examples;

FIG. 4 illustrates a block diagram of the geometric transformation module to transform original slice data according to some examples;

FIG. 5 illustrates a block diagram of the sacrificial structure generation module to transform the original slice data according to some examples;

FIG. 6 illustrates a block diagram of the virtual object generation module to transform the original slice data according to some examples;

FIG. 7 illustrates a block diagram of the slice combining module to transform the original slice data according to some examples;

FIG. 8 illustrates a block diagram of the slice dividing module to transform the original slice data according to some examples;

FIG. 9 illustrates a block diagram of the density modification module to transform the original slice data according to some examples;

FIG. 10 is a flow diagram illustrating a method of generating a three-dimensional object according to some examples; and FIGS. 11a-d show a series of cross-sectional side views of layers of build material according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Some additive manufacturing systems generate three-dimensional objects through the solidification of portions of successive layers of build material, such as a powdered or liquid build material. The properties of generated objects may be dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. In some examples, a multiple agent additive manufacturing system may be used such as that described in PCT Application No. PCT/EP2014/050841. For example, in addition to selectively delivering coalescing agent to layers build material, coalescence modifier agent may also be selectively delivered to layers of build material. A coalescence modifier agent serves to modify the degree of coalescence of a portion of build material on which the coalescence modifier agent has been delivered or has penetrated. In yet other examples, other methods of solidification may be used, for example fused deposition modeling (FDM), selective laser sintering (SLS), light polymerization, among others. The examples described herein may be used with any of the above additive manufacturing systems and suitable adaptations thereof.

In some examples, additive manufacturing systems may unintentionally introduce distortions into generated objects such that the object does not faithfully reproducing a three-dimensional object model used to generate the object. Such distortions may include, for example, geometrical distortions which may cause, for example, various object distortions, such as edge distortions, and surface distortions, to name but a few. Additionally, desired object properties, including but not limited to surface roughness, accuracy, and strength, may not be achieved.

Accordingly, the present disclosure provides for modifying slice data based on system feedback while generating the object to achieve desired object properties. Each slice of a three-dimensional object to be generated may be defined according to its respective slice data.

Initially, digital representations of an object may be generated. An example digital representation is object design data representing a three-dimensional model of an object to be generated. Slice data for each slice of the object may be generated based on the object design data. In some examples, the slice data may initially be on a vector format, and then may be processed sequentially into a contone format, then into halftone data, and then into mask data which may define on which portions of a layer of build material any agents are to be selectively delivered. In other examples, any other suitable slice data formats may be generated that can be used in any of the solidification methods described earlier.

At one or more of these stages, such as when the slice data is vector data, contone data, halftone data, and/or mask data, the slice data may be processed, e.g. modified, depending on characteristics of the build process. Such characteristics may include measured feedback obtained while generating the object. Examples of measured feedback include measured temperature of build material, captured images of build material, measured thickness of a layer of build material, and other types of feedback. The characteristics may also include known and/or stored characteristics of the additive manufacturing system on which the object is to be generated, characteristics of the build material, characteristics of the build process such as the solidification process used, or other characteristics.

To compensate for distortions or to achieve desired object properties, different kinds of transformations or processing may be performed on the slice data while generating the object. An additive manufacturing system may generate each layer of an object based on the transformed slice data to produce an object that accurately matches the object described in the original object design data.

Figure 1:
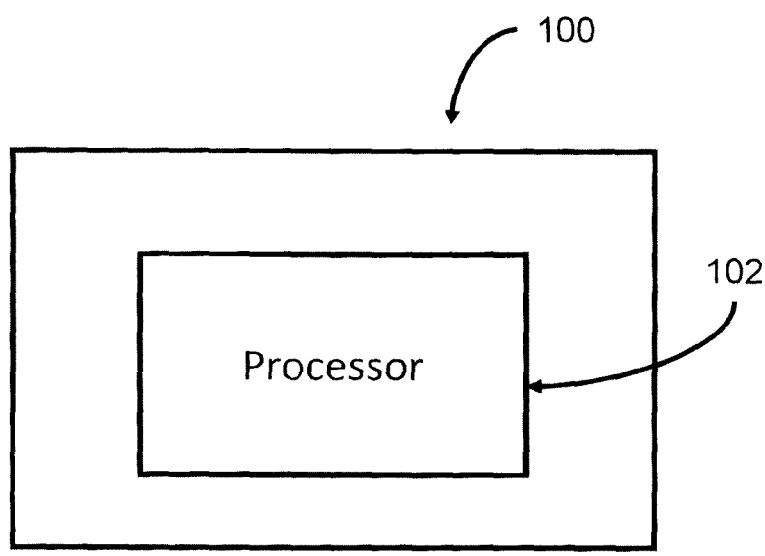
FIG. 1 illustrates a block diagram of a system for processing slice data representing a slice of a three-dimensional object to be generated by an additive manufacturing system according to some examples.

FIG. 1 illustrates a block diagram of a system 100 for processing slice data representing a slice of a three-dimensional object to be generated by an additive manufacturing system according to some examples. The system 100 includes a processor 102 to perform, when the additive manufacturing system is to generate the slice, a transformation on the slice data based on characteristic data of the additive manufacturing system, the slice data derived from three-dimensional object design data. The processor 120 is to cause the additive manufacturing system to generate the slice based on the transformed slice data.

FIG. 2a is a simplified isometric illustration of an additive manufacturing system 200 according to some examples. The system 200 may be operated, as described further below with reference to the flow diagram of FIG. 10 to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

The additive manufacturing system 200 may include a system controller 210. Any of the operations and methods disclosed herein may be implemented and controlled in the additive manufacturing system 200 and/or controller 210.

The controller 210 may include a processor 212 for executing instructions that may implement the methods described herein. The processor 212 may, for example, be a microprocessor, a microcontroller, a programmable gate array, an application specific integrated circuit (ASIC), a graphics processing unit (GPU), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The controller 210 may support direct user interaction. For example, the additive manufacturing system 200 may include user input devices 220 coupled to the processor 212, such as one or more of a keyboard, touchpad, buttons, keypad, dials, mouse, track-ball, card reader, or other input devices. Additionally, the additive manufacturing system 200 may include output devices 222 coupled to the processor 212, such as one or more of a liquid crystal display (LCD), printer, video monitor, touch screen display, a light-emitting diode (LED), or other output devices. The output devices 222 may be responsive to instructions to display textual information or graphical data.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. In some examples, the computer-readable storage medium 216 may be a memory in a cloud. The computer-readable storage medium 216 may be non-transitory. The computer-readable storage medium 216 may store, encode, or carry computer executable instructions 218 that, when executed by the processor 212, may cause the processor 212 to perform any one or more of the methods or operations disclosed herein according to various examples. In some examples, the instructions 218 may comprise any of the slice data and/or transformation modules described herein.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light absorbers are dye based colored ink and pigment based colored ink, such as inks commercially known as CM993A and CE042A available from Hewlett-Packard Company.

The controller 210 controls the selective delivery of coalescing agent to a layer of provided build material in accordance with mask data of the instructions 218.

The agent distributor 202 may be a printhead, such as a thermal inkjet printhead or a piezo inkjet printhead. The printhead may have arrays of nozzles. In one example, printheads such as those commonly used in commercially available inkjet printers may be used. In other examples, the agents may be delivered through spray nozzles rather than through printheads. Other delivery mechanisms may be used as well. The agent distributor 202 may be used to selectively deliver, e.g. deposit, coalescing agent when in the form of suitable fluids such as a liquid.

The coalescing agent distributor 202 may include a supply of coalescing agent or may be connectable to a separate supply of coalescing agent.

The system 200 may include an imaging device 230, for example a digital camera. The imaging device 230 may be in the form of a scan bar to a movable carriage, examples of which will be described in FIGS. 2b and 2c. The imaging device 230 may capture images of the build material by sweeping or scanning over the entire area of the build material. The images may, in some examples, be captured in the visible light range. The images may, for example, be stored in a suitable bitmap format, for example having a resolution of 600 dots per inch. In some examples, the resolution may be greater than the resolution of contone slice data, halftone slice data, and/or mask slice data that may be used for depositing agents. The imaging device 230 may output the images to the controller 210.

FIG. 2b is a simplified schematic top view of agent distributors 202a-b and an imaging device 230a mounted on a moveable carriage 203a according to some examples, and FIG. 2c is a simplified schematic top view of agent distributors 202c-d and the imaging device 230b mounted on a moveable carriage 203b according to some examples. Each of these configurations may be used in the system 200. The agent distributors 202a-d may each have similar features as the agent distributor 202 described earlier. Additionally, the imaging devices 230a-b may each have similar features as the imaging device 230 described earlier.

In FIG. 2b, each of the agent distributors 202a-b has a length that enables it to span the whole width of the support member 204 in a so-called page-wide array configuration. In some examples, each agent distributor 202a-b may be a single printhead having an array of nozzles having a length to enable it to span the width of the support member 204 along the illustrated x-axis, as shown in FIG. 2b. In other examples, a suitable arrangement of multiple printheads may be placed in-line to achieve a page-wide array configuration. Thus, using the carriage 203a, the agent distributors 202a-b and the imaging system 230a may be movable bi-directionally across the length of the support 204 along the illustrated y-axis. This enables selective delivery of coalescing agent across the whole width and length of the support 204 in a single pass.

In FIG. 2c, each of the agent distributors 202c-d may have a shorter length that does not enable it to span the whole width of the support member 204. In this example, each of the agent distributors 202c-d may be laterally movable along the entire width of the support member 204 along the illustrated x-axis. Thus, using the carriage 203b, the agent distributors 202c-d and the imaging system 230b may be movable bi-directionally across the length of the support 204 along the illustrated y-axis. This enables selective delivery of coalescing agent across the whole width and length of the support 204 in multiple passes.

In other examples the agent distributors may be fixed, and the support member 204 may move relative to the agent distributors.

It should be noted that the term 'width' used herein is used to generally denote the shortest dimension in the plane parallel to the x and y axes illustrated in FIGS. 2a-c, whilst the term 'length' used herein is used to generally denote the longest dimension in this plane. However, it will be understood that in other examples the term 'width' may be interchangeable with the term 'length'.

The system 200 may further comprise a build material distributor 224 to provide, e.g. deliver and/or deposit, successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to deposit a layer of build material. As previously described, a layer of build material will be deposited on the support member 204, whereas subsequent layers of build material will be deposited on a previously deposited layer of build material. The build material distributor 224 may be a fixed part of the system 200, or may not be a fixed part of the system 200, instead being, for example, a part of a removable module. In some examples, the build material distributor 224 may be mounted on the carriage 203a or 203b.

In some examples, the thickness of each layer may have a value selected from the range of between about 50 to about 300 microns, or about 90 to about 110 microns, or about 250 microns, although in other examples thinner or thicker layers of build material may be provided. The thickness may be controlled by the controller 210, for example based on the instructions 218.

In some examples, there may be any number of additional agent distributors and build material distributors relative to the distributors shown in FIGS. 2a-c. In some examples, as shown in FIGS. 2b-c, the distributors of system 200 may be located on the same carriage, either adjacent to each other or separated by a short distance. In other examples, two or more carriages each may contain one or more distributors. For example, each distributor may be located in its own separate carriage. Any additional distributors may have similar features as those discussed earlier with reference to the coalescing agent distributor 202. However, in some examples, different agent distributors may deliver different coalescing agents and/or coalescence modifier agents, for example.

In the example shown the support 204 is moveable in the z-axis such that as new layers of build material are deposited a predetermined gap is maintained between the surface of the most recently deposited layer of build material and lower surface of the agent distributor 202. In other examples, however, the support 204 may not be movable in the z-axis and the agent distributor 202 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage 203*a* or 203*b*.

In other examples, the energy source 226 may apply a variable amount of energy as it is moved across the layer of build material, for example in accordance with instructions 208. For example, the controller 210 may control the energy source only to apply energy to portions of build material on which coalescing agent has been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that, excluding the effects of any coalescence bleed: i) portions of the build material on which no coalescing agent have been delivered do not coalesce when energy is temporarily applied thereto; ii) portions of the build material on which only coalescing agent has been delivered or has penetrated coalesce when energy is temporarily applied thereto do coalesce.

In some examples, the system 200 may additionally comprise a pre-heater to maintain build material deposited on the support 204 within a predetermined temperature range. Use of a pre-heater may help reduce the amount of energy that has to be applied by the energy source 226 to cause coalescence and subsequent solidification of build material on which coalescing agent has been delivered or has penetrated.

The system 200 may additionally include a temperature sensor 228, for example a point contactless temperature sensor such as one or more thermopiles, or such as a thermographic camera. In other examples, the sensor 229 may include an array of fixed-location pyrometers which each capture radiation from a single area of the build material. In other examples, the sensor 229 may be a single pyrometer which may be operable to sweep or scan over the entire area of the build material. Other types of sensors may also be used.

The temperature sensor 228 may be to capture a radiation distribution, for example in the IR range, emitted by each point of the build material across the area spanned by the build material on the support member 204. The temperature sensor 228 may output the radiation distribution to the controller 210, which may determine a temperature distribution across the build material based on known relationships, such as a black body distribution, between temperature and radiation intensity for the material used as the build material. For example, the radiation frequencies of the radiation distribution may have their highest intensities at particular values in the infra-red (IR) range. This may be used to determine the temperature distribution comprising a plurality of temperatures across the build material.

The sensor 228 may be oriented generally centrally and facing generally directly toward the build material, such that the optical axis of the camera targets the center line of the support member 204, to allow a generally symmetric capture of radiation from the build material. This may minimize perspective distortions of the build material surface, thus minimizing the need for corrections, and reducing errors in measured temperature values versus real temperature values. Additionally, the sensor 228 may be able to (1) capture the image over a wide region covering an entire layer of build material, for example by using suitable magnification, (2) capture a series of images of the entire layer which are later averaged, or (3) capture a series of images each covering a portion of the layer that together cover the entire layer. In some examples, the sensor 228 may be in a fixed location relative to the support member 204, but in other examples may be moveable if other components, when moving, disrupt the line of sight between the camera 228 and the support member 204.

The system 200 may additionally include a layer thickness sensor 232. The layer thickness sensor 232 may be to detect the thickness of the current layer (most recent layer) deposited on the support member 204. Prior to delivering the current layer, the top surface of the support member 204 (or if any layers are on the support member 240, then the top surface of the previously deposited layer) may have been positioned at a known point along the z-axis. Thus, the height of a current layer after it has been deposited may be measured by the sensor 232, and by determining the difference between the measured height and the point at which the support member 204 was positioned along the z-axis, the thickness of the current layer may be determined.

FIG. 3 illustrates a block diagram of data processing pipeline 300 according to some examples. Any processing in the pipeline 300 may be performed by the controller 210 and/or another controller external to the additive manufacturing system 200.

The controller 210 may obtain object design data 302 representing a model of a three-dimensional object 312 to be generated by an additive manufacturing system. The controller 210 may perform a series of processing steps on the obtained object design data 302 to generate a series of different types of slice data, including vector slice data 304, contone slice data 306, halftone slice data 308, and mask slice data 310. The additive manufacturing system 200 may obtain the mask slice data 310 and process the data 310 to control the system 200 to generate a three-dimensional object 312. In some examples the additive manufacturing system 302 may perform further processing on the mask slice data 310 to generate data to control the additive manufacturing system 200 to generate the three-dimensional object 312. In other examples, different types of slice data may be generated as part of the pipeline 300. Additionally, it should be noted that the particular images shown in FIG. 3 are purely illustrative.

The object design data 302 may be derived, for example, by a suitable three-dimensional object processing system. In some examples the three-dimensional object processing system may be comprised within the additive manufacturing system 200. For example, the instructions 218 may additionally include instructions that, when executed by the processor 212, cause the processor 212 to operate as a three-dimensional object processing system as described herein. In other examples the three-dimensional object processing system may be external to the additive manufacturing system 200. For example, the three-dimensional object processing system may be a software application, or part of a software application, executable on a computing device separate from the system 200.

In addition to representing a model of the three-dimensional object 312, the object design data 302 may also represent object property data representing properties of the object such as density, surface roughness, strength, and the like. Additionally, the additive manufacturing system 200 described herein and described in PCT Application No. PCT/EP2014/050841 mentioned above may allow three-dimensional objects to be created that may have controllably variable, or different, object properties within a single generated object, for example: variable accuracy properties; variable surface roughness properties; variable strength properties; variable object porosity properties; variable inter-layer strength properties; variable object elasticity properties; variable density properties; and other variable mechanical or physical properties. For example, a created object may comprise one portion that has a first level of surface roughness, and a second portion that has a second level of surface roughness. Variable object properties may be generated within a generated object by depositing appropriate patterns of a coalescing agent and a coalescence modifier agent on a layer of build material.

The object property data may, for example, be defined within the object model data 302, or may, for example, be defined using external object property data. The object property data may define, for example, that a portion, or the whole, of, an object is intended to have a certain object property, such as a certain surface smoothness. The object property data may also define multiple object properties for portions of an object.

The generation of a three-dimensional object with controllably variable properties may be possible, for example, by modulating the manner in which agents, such as a coalescing agent and a coalescence modifier agent, are delivered to the layers of build material by the additive manufacturing system used to generate the object.

The object design data 302 may be received, for example, from a user via an input device 220, as input from a user, from a software driver, from a software application such as a computer aided design (CAD) application, or may be obtained from a memory storing default or user-defined object design data.

The vector slice data 304 may be generated based on the object design data 302 using the processor 212 or using a separate suitable three-dimensional object processing system. The generated vector slice data 304 may represent multiple slices of the object design data 302 in a suitable vector graphics format that may use, for example, geometrical primitives such as points, lines, curves, polygons, etc. some or all of which may be based on mathematical expressions. The vector slice data 304 for each slice may be represented in only two dimensions.

FIG. 3 shows a number of images 304a-n, each representing a slice of the object model having a predetermined thickness, and defining a portion or portions of a layer of build material that are to be part of the three dimensional object 312.

In one example, the thickness of each slice may be in the range of about 50 to about 200 microns, depending on the nature of the additive manufacturing system 200. In some examples each generated slice may represent other thicknesses. In another example the thickness of each generated slice may be less than the thickness of each layer processed by the additive manufacturing system 200. In one example, the thickness of each generated slice may be in the range of about 10 to 50 microns. If the slices are thinner than the thickness of each layer of build material processed by the additive manufacturing system 200 the additive manufacturing system 200 may combine multiple slices. This 'oversampling' of slices may enable the additive manufacturing system 200 to improve the quality of generated objects, for example, by enabling interpolation of data between adjacent slices. This may be beneficial, for example, if a feature of the object model 302 coincides with a boundary between two layers of build material.

The contone slice data 306 may be generated based on the vector slice data 304 using the processor 212 or using a separate suitable three-dimensional object processing system. The generated contone slice data 306 may represent images 306a-n for multiple slices, each converted from a respective image 304a-n of the vector slice data 304 into a continuous tone or 'contone' image in a suitable bitmap or rasterized format representing multiple channels, or separations, each having an appropriate bit depth, such as 8 bits. Each image 306a-n may be represented in only two dimensions. The generation of contone images for each slice may involve, for example, converting vector slice data 304 of each slice into solid and non-solid areas, based on the geometries defined for each slice.

In one example, each generated contone image may define, for each pixel of the contone image, a density or other property at a corresponding location on a layer of build material. For example, in a contone image having a bit depth of 8 bits, each pixel of the contone image may represent one of 256 (zero to 255) levels. This may enable the object 312 to be generated having variable object properties throughout the object 312.

The halftone slice data 308 may be generated based on the contone slice data 306 using the processor 212 or using a separate suitable three-dimensional object processing system. The generated halftone slice data 308 may represent images 308a-n for multiple slices, each converted from a respective image 306a-n of the contone slice data 306 into an image representing the locations or patterns in which drops of agent are to be deposited on a layer of build material. In some examples, in an additive manufacturing system that uses two agents, such as a coalescing agent and a coalescence modifier agent, each image may define a portion, or portions, of a layer of build material on which a coalescing agent is to be delivered, and may define a portion, or portions, of a layer of build material on which a coalescence modifier agent is to be delivered. In an additive manufacturing system that uses more than two agents each image may define a portion, or portions, of a layer of build material on which each agent is to be delivered. In some examples, the halftone slice data 308 may also represent the patterns, ratios, densities, etc. of coalescing agent and coalescence modifier agent to be deposited on layers of build material.

The mask slice data 310 may be generated based on the halftone slice data 308 using the processor 212 or using a separate suitable three-dimensional object processing system. The generated mask slice data 310 may represent images 310a-n for multiple slices, each converted from a respective image 308a-n of the halftone slice data 308 into an images representing the timing of when drops of agent are to be deposited in locations or patterns on a layer of build material. This may depend, for example, on whether mechanisms used to deposit the drops of agents use, for example, page wide arrays of printhead nozzles, or scanning printheads. The controller 210 may control selective delivery of the agents in accordance with instructions 218 comprising the mask slice data 310.

In any of the above examples of slice data, including vector slice data 304, contone slice data 306, halftone slice data 308, and mask slice data 310, each slice may be represented by a single image. For example, each image may include multiple separations or channels, with each channel defining a portion, or portions, of a layer of build material on which a different agent is to be deposited by an additive manufacturing system. In another example, each slice may be represented by multiple images, with each image of the slice defining a portion, or portions, of a build material on which a different agent is to be deposited by an additive manufacturing system.

Each of the slice data 304, 306, 308, and 310 may also include representations of the property data of the object design data. For example, a pattern of agents to be delivered as defined in the mask slice data 310 may result in suitable variable object properties in the generated object 312.

The processor 212 or other suitable three-dimensional object processing system may comprise a transformation module 314. The transformation module 314 may include a geometrical transformation module 316, a sacrificial structure generation module (SSG) 318, a virtual object generation (VOG) module 320, a slice combining module 322, and a slice dividing module 323. Each of these modules 316, 318, 320, 322, 323, and 325 may perform respective transformations on slice data. In some examples, each transformation module may be implemented using software, hardware, or a combination of software and hardware.

The processor 212 or other suitable processing system may be to perform each of the transformations on one of the slice data 304, 306, 308, or 310. For example, the controller 210 may be to perform each of transformations on (1) the vector slice data 304 prior to generating the contone slice data 306 based on the vector slice data 304, (2) the contone slice data 306 prior to generating the halftone slice data 308 based on the contone slice data 306, (3) the halftone slice data 308 prior to generating the mask slice data 310 based on the halftone slice data 308, or (4) the mask slice data 310 prior to generating the contone slice data 306 based on the vector slice data 304. In other examples, some of the transformations may be performed on one of the slice data 304, 306, 308, or 310, while other transformations may be performed on another of the slice data 304, 306, 308, and 310. For example, different modules may be applied to different slice data 304, 306, 308, or 310. In yet other examples, some or all of the modules 316, 318, 320, 322, 323, and 325 may transform more than one of the slice data 304, 306, 308, or 310.

In some examples, the processing steps on the slice data may be performed prior to generating the object 312, such that each slice of the mask slice data 310 is generated prior to generating the object 312. In other examples, some processing steps may be performed while generating the object 312. For example, each slice of the vector slice data 304 may be generated prior to generating the object 312. Then, when the build process has begun, for each slice, the pipeline may perform the remainder of the processing stages for the current slice, such that the current slice of mask slice data 310 is generated for use in depositing agents to generate the current slice of the object 312.

In some examples, characteristic data 324 may be received by the controller 210, and the transformations may be performed, while the object 312 is being generated, based on the characteristic data 324 of the build process, such as (1) measured feedback based on measurements made during the build process, and/or (2) stored characteristics of the system 200 that may, for example, be obtained from the system 200 or from a remote network location, such as a manufacturer's web site, or in any other suitable manner. In other examples, some of the transformations may be made prior to generating the object 312.

Examples of characteristic data 324 include but are not limited to measured feedback such as data 326 representing temperatures of build material from the temperature sensor 228 described earlier, data 328 representing images obtained by the imaging device 230 described earlier, layer thickness data 330 representing a thickness of a layer of build material obtained by the layer thickness sensor 232 described earlier, data representing measured environmental conditions, or other measured feedback. Examples of characteristic data 324 also include data 332 representing stored or known characteristics of the additive manufacturing system 200, for example properties of the agents to be used such as coalescing agent and coalescence modifier agent, properties of the build material including physical characteristics such as humidity level, type, average particle size, and pureness of build material, properties of the energy source 226, properties of the heater 230, properties of the temperature sensor 228, expected environmental conditions of the system 200, and other aspects of the additive manufacturing system 200.

In one example, the characteristic data 106 may define characteristics of a build material to be used by an additive manufacturing system. For example, the characteristic data 106 may comprise data relating to physical characteristics of the build material, the age of the build material, the humidity level of the build material, the type of build material, the average particle size of the build material (for powdered build materials), the pureness of the build material, and so on. In some examples, stored characteristic data may be stored in the format of a lookup table.

FIG. 4 illustrates a block diagram of the geometric transformation module 316 to transform original slice data 400 according to some examples. The original slice data 400 may be a non-transformed slice of any of the slice data 304, 306, 308, or 310. When a given slice is to be generated during the build process, measured or stored characteristic data 324 may be obtained. Then, the geometrical transformation module 316 may perform geometric transformations on the slice data 400, for example, to compensate for differences between the slice as defined in slice data 400, and the corresponding slice of the object 312 to be generated by an additive manufacturing system from the slice data 400.

For example, some additive manufacturing systems may unintentionally introduce geometric distortions, such as size distortions, edge distortions, surface distortions, and the like, during the generation of a three-dimensional object. This may lead to a generated three-dimensional object not faithfully reproducing a three-dimensional object model used to generate the object. The details relating to any such distortions may be included in, or may be derivable from, the characteristic data 324 described above.

For example, through experimentation it may be determinable that the additive manufacturing system 200 unintentionally generates three-dimensional objects that are a smaller by a given percentage in a particular axis or axes. This could occur, for example due to build material contraction during the generation of three-dimensional objects. Such data may be reflected in the characteristic data 324. Accordingly, when the processor 212 is to process slice data 400 the geometrical transformation module 316 may obtain the characteristic data 324 and may apply a suitable geometrical scaling factor to the slice data 400. In this way a corresponding slice of the object 312 generated by the additive manufacturing system 200 may better conform to the slice data 400.

In another example, distortions may be unintentionally introduced into three-dimensional objects generated by the additive manufacturing system 200 due to factors such as, for example, the heating of build material and the cooling of build material. If such distortions can be quantified, e.g. through measured feedback or previously stored data, they may be included in the characteristic data 324 and used by the geometrical transformation module 316 to perform a suitable geometrical transformation to compensate for any distortion.

In some examples, the characteristic data 324 may be linked to environmental or other conditions. For example, it may be determined that when the ambient temperature is 20 degrees Celsius a first scaling factor is to be applied in a given axis or axes, whereas when the ambient temperature is 30 degrees Celsius a second scaling factor is to be applied.

In other words, the characteristic data 324 may comprise any suitable data that may be related to causing, either directly or indirectly, an unintentional geometrical transformation in objects generated by an additive manufacturing system.

In some examples, a transformation may include applying a global scaling factor to the slice described in the slice data 400. In other examples, a transformation may include complex transformations based on factors relating to the object model or slice data 400 such as model geometry, model surface topology, model structure, and proximity of structural features within an object model or slice data 400.

In some examples, if the slice data 400 includes a base layer feature, such as a downward or upward facing surface, a suitable geometric transformation may be performed so as to achieve desired accuracy of the surface.

Any of the above geometrical transformations may be applied. In the example shown in FIG. 4, the geometric transformation module 316 transforms a slice of the slice data 400 by applying a global scaling factor to scale-up the slice defined by the slice data 400, resulting in a scaled-up slice 401 in transformed slice data 402. Other suitable transformations may also be performed. Once transformations are performed, the transformed slice data 402 may then be used in the next stage of the pipeline 300. For example, if the transformed slice data 402 is a vector slice data for a current slice of the object 312 to be generated, then subsequent processing to convert to the vector slice data into mask slice data may be performed, after which mask slice data may be used to deposit agents on the current layer of build material.

FIG. 5 illustrates a block diagram of the SSG module 318 to transform the original slice data 400 according to some examples. When a given slice is to be generated during the build process, measured or stored characteristic data 324 may be obtained. Then, the SSG module 318 may generate new features that are added to the slice data 400. The new features may be features that were not included in the original slice data 400. The new features may be structural features that may be generated with the object 312 when the object 312 is generated by the additive manufacturing system 200 but which may be removed prior to the generated object 312 being deemed a final object. For example, at least some of the sacrificial structures may be removed during a manual or automatic post-processing operation.

The type of sacrificial structure to be added to the slice data 400 by the SSG module 318 may be dependent, at least in part, on the characteristic data 324. The characteristic data 324 may, for example, define the conditions or circumstances, which may be based on measured feedback or known characteristics, in which a sacrificial structure may be added to the slice data 400. The SSG module 318 may then add suitable features to the slice data 400. Additionally, in some examples, slice data 400 for successive slices may be suitably transformed to ensure that suitable three-dimensional sacrificial structures are generated.

For example, the characteristic data 324 may define the conditions under which it may be useful to add (1) anchoring features to the slice data 400 to help ensure that during generation of the object 312 is suitably supported or anchored on the build support member 204 of an additive manufacturing system 200, and/or (2) additional structural elements to the slice data 400 to help ensure structural integrity of certain features of the object 312. The SSG module 318 may add suitable features to the slice data 400, or to slice data 400 for successive slices to add an entire three-dimensional anchoring feature and/or structural element.

In some examples, the characteristic data 324 may define the conditions, based on temperature measurements or other data, under which it may be useful to add a 'heat reservoir' in proximity to a portion of the object 316 to help control the accumulation of heat and hence to control the effect of thermally induced stresses on a generated object. A heat reservoir may comprise, for example, an additional object, such as solid or other non-solid object, that is proximate to the object 316 and which serves to absorb or emit heat during the generation of a three-dimensional object. The SSG module 318 may add a suitable heat reservoir data to the slice data 400, or to slice data 400 for successive slices to add an entire three-dimensional heat reservoir.

In some examples, such as when slice data 400 defines part of an overhanging structure, the SSG module 318 may add part of a sacrificial object to the slice data 400. The added sacrificial object may, for example, have the same, or a similar, shape profile to the overhanging structure and be positioned below the overhanging structure object, but not connected to it. The added sacrificial object may act as heat source and may help decrease the thermal gradients experienced by the overhanging structure. This may, for example, help reduce the distortion of the overhanging structure. The same technique may also be used for other structural features other than overhanging structures. The SSG module 318 may add suitable features to slice data 400, or to slice data 400 for successive slices to add an entire three-dimensional sacrificial object.

Any of the above sacrificial structures may be added. In the example shown in FIG. 5, the SSG module 318 adds an example sacrificial object 403 to the slice data 400 as shown, resulting in transformed slice data 404. Other suitable transformations may also be performed. Once transformations are performed, the transformed slice data 404 may then be used in the next stage of the pipeline 300. For example, if the transformed slice data 404 is a vector slice data for a current slice of the object 312 to be generated, then subsequent processing to convert to the vector slice data into mask slice data may be performed, after which mask slice data may be used to deposit agents on the current layer of build material.

FIG. 6 illustrates a block diagram of the VOG module 320 to transform the original slice data 400 according to some examples. When a given slice is to be generated during the build process, measured or stored characteristic data 324 may be obtained. As discussed earlier, an object property may be defined by object design data 302 and may thus also be represented in slice data 400 generated based thereon. The VOG module 320 may generate new 'virtual' objects, defined in virtual object data that may be based on object property data represented in the slice data 400. Virtual objects are objects that are not physically generated by an additive manufacturing system but which may cause a portion of a generated object to have different object properties.

In some examples, in response to object property data associated with the slice data 400, the VOG module 318 may generate a virtual object, such as virtual object 405 illustrated with dashed lines in FIG. 6. A portion or the whole of a generated virtual object may spatially coincide with a portion or the whole of a slice of the slice data 400, as shown. In some examples a virtual object may also not spatially coincide with a portion of the slice of the slice data 400, but may be proximate thereto.

As illustrated in FIG. 6, the generated virtual object 405 spatially coincides with portions of the slice in the slice data 400. In the example shown it can be seen that the virtual object 405 spatially coincides with a thin area around the boundary of the slice of the slice data 400. This could, for example, be as a result of object property data defining the boundary of the object 312 to have a different object property than the inner portions of the object 312. For example, the differing object properties may be any of the variable mechanical or physical properties discussed earlier.

FIG. 7 illustrates a block diagram of the slice combining module 322 to transform the original slice data 400 according to some examples. As discussed earlier, the original slice data 400 may be a non-transformed slice of any of the slice data 304, 306, 308, or 310. Additionally, the original slice data 407 may a different non-transformed slice of any of the slice data 304, 306, 308, or 310. In one example, the original slice data 400 may represent slice 306*a* of contone slice data 306 and the original slice data 407 may represent the adjacent slice 306*b* of contone slice data 306. When, for example, slice 306*a* is to be generated during the build process, measured or stored characteristic data 324 may be obtained. The slice combining module 322 may combine slices, for example adjacent slices such as slices 306*a-b*, based on any of the characteristic data 324 described earlier. Slice combining may be done by any suitable algorithm In some examples, the slice combining module 322 may combine slices, such as in slice data 400 and 407, based on measured layer thickness data 330. For example, if there is a mismatch between the thickness of the delivered current build material layer and the slice defined by the slice data 400, then the slice combining module 322 may combine slices such that the thicknesses of the layers and the slices match. For example, if the thickness of the delivered current layer is double compared to the thickness of each slice 306*a* (of slice data 400) and slice 306*b* (of slice data 407), then the slices 306*a-b* (as represented in their slice data 400 and 407) may be combined into a single slice in transformed slice data 408. The single slice may thus have the same thickness as the delivered current layer. In some examples, more than two slices may be combined. Additionally, in some examples, thicker build material layers may be delivered so as reduce the time taken to generate the object 312.

FIG. 8 illustrates a block diagram of the slice dividing module 323 to transform the original slice data 400 according to some examples. In one example, the original slice data 400 may represent slice 306*a* of contone slice data 306. When, for example, slice 306*a* is to be generated during the build process, measured or stored characteristic data 324 may be obtained. The slice dividing module 323 may divide a slice based on any of the characteristic data 324 described earlier. Slice dividing may be done by any suitable algorithm, for example linear or bilinear interpolations.

In some examples, the slice dividing module 323 may divide a slice, such as in slice data 400, based on measured layer thickness data 330. For example, if there is a mismatch between the thickness of the delivered current build material layer and the slice defined by the slice data 400, then the slice dividing module 323 may divide slices such that the thicknesses of the layers and the slices match. For example, if the thickness of the delivered current layer is half compared to the thickness of the slice 306*a* (of slice data 400), then the slice 306*a* (as represented in the slice data 400) may be divided into two slices in respective transformed slice data 409 and 410. Each slice in the slice data 409 and 410 may thus have the same thickness as the delivered current layer. In some examples, a slice may be divided into more than two slices.

Additionally, in some examples, thinner layers of build material may be delivered so as reduce an effect called "stair-stepping" in the object 312. "Stair-stepping" refers to an effect wherein layer-by-layer manufacturing may result in accurate and smooth object surfaces along x-y axis planes defined by each layer, but inaccurate and rough object surfaces along the z-axis, which is the axis that extends through multiple layers. The degree of inaccuracy may depend on the thickness of each layer of build material. Stair-stepping may be reduced by delivering thinner build material layers, and dividing slices using the slice dividing module 323 such that the slices are thinner so as to correspond to the thinner build material layers.

FIG. 9 illustrates a block diagram of the density modification module 325 to transform the original slice data 400 according to some examples. When a given slice is to be generated during the build process, measured or stored characteristic data 324 may be obtained, including for example the temperature sensor data 326, image sensor data 328, and/or based on thermal process models. Based on the characteristic data 324, the density modification module 325 may modify the density and/or pattern of agents to be delivered to the current layer of build material to generate the slice corresponding to the slice data 400. For example, the temperature of the current layer of build material, prior to agent delivery, may be affected by the patterns of solidified agents in previous layers. Thus, based on the measured temperature or based on temperature determined according to a thermal process model, the agent density defined in the slice data 400 may be modified. For example, portions of the current layer under which agents have solidified in previous layers may have higher temperatures. Thus, these portions may be provided with fewer agents than otherwise, so as to achieve the desired amount of heat in these portions when energy is applied by the energy source 226 to achieve desired solidification. In some examples, the slice data 400 may be a slice of contone slice data 306, and the modifications may involve modifications to contone level in the slice of the contone slice data 306. In other examples, other types of slice data may also be modified by the density modification module 325.

Although of the modules 316, 318, 320, 322, 323, and 325 are shown processing original slice data 400, in other examples, any modules may process slice data that has already been processed by any or all of the other modules. Thus, any sequence of the modules may be applied to the original slice data 400.

FIG. 10 is a flow diagram illustrating a method 500 of generating a three-dimensional object according to some examples. The method may be computer implemented. In some examples, the orderings shown may be varied, such that some steps may occur simultaneously, some steps may be added, and some steps may be omitted. In describing FIG. 10, reference will be made to FIGS. 2-9 and 11*a-d*. FIGS.

11a-d show a series of cross-sectional side views of layers of build material according to some examples.

At 502, the controller 210 may obtain object design data 302.

At 504, vector slice data 304 may be generated based on the object design data 302, as discussed earlier. In other examples, the vector slice data 304 may be processed into different types of slice data 306, 308, and 310 in the pipeline 300.

Figure 11A:
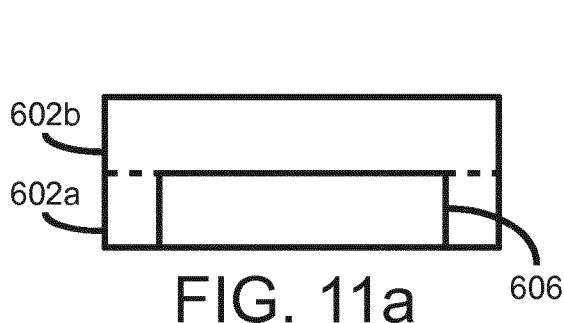

At 506, a layer 602b of build material may be provided, as shown in FIG. 11a. For example, the controller 210 may control the build material distributor 224 to provide the layer 602b on a previously completed layer 602a on the support member 204 by causing the build material distributor 224 to move along the y-axis as discussed earlier. The completed layer 602a may include a solidified portion 606. Although a completed layer 602a is shown in FIGS. 11a-d for illustrative purposes, it is understood that the steps 506 to 512 may initially be applied to generate the first layer 602a.

At 508, the current slice of the vector slice data 304 may be transformed by any of the modules 316, 318, 320, 322, 323, and/or 325, as described earlier. The vector slice data 304 may be processed into different types of slice data 306, 308, and 310 in the pipeline 300. In some examples, the other types of slice data 306, 308, and 310, when generated, may be transformed by any of the modules.

Figure 11C:
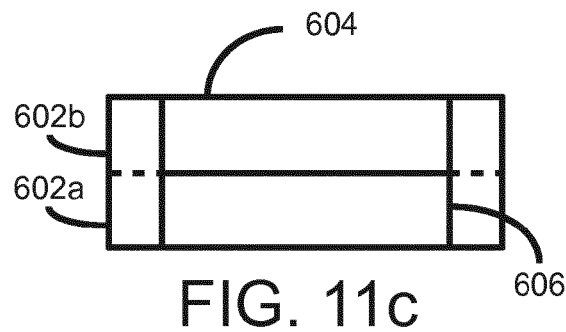
Figure 11B:
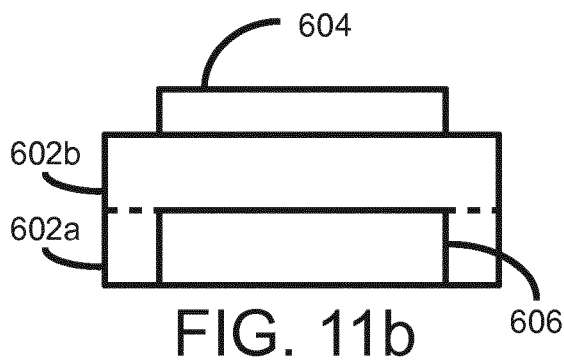

At 510, as shown in FIG. 11b, coalescing agent 604 may be selectively delivered to the surface of portions of the layer 602b. As discussed earlier, the agent 604 may be delivered by agent distributor 202, for example in the form of fluids such as liquid droplets.

The selective delivery of the agent 604 may be performed in patterns on the portions of the layer 602b that the current slice of the mask data 310 (generated at 504 or 508) may define to become solid to form part of the three-dimensional object being generated. "Selective delivery" means that agent may be delivered to selected portions of the surface layer of the build material in various patterns. The patterns may be defined by the mask data 310.

In some examples, coalescence modifier agent may similarly be selectively delivered to portions of the layer 602b.

FIG. 11c shows coalescing agent 604 having penetrated substantially completely into the portions of the layer 602b of build material, but in other examples, the degree of penetration may be less than 100%. The degree of penetration may depend, for example, on the quantity of agent delivered, on the nature of the build material, on the nature of the agent, etc.

Figure 11D:

At 512, a predetermined level of energy may be temporarily applied to the layer 602b of build material. In various examples, the energy applied may be infra-red or near infra-red energy, microwave energy, ultra-violet (UV) light, halogen light, ultra-sonic energy, or the like. The temporary application of energy may cause the portions of the build material on which coalescing agent 604 was delivered to heat up above the melting point of the build material and to coalesce. In some examples, the energy source may be focused. In other examples, the energy source may be unfocused, and the temporary application of energy may cause the portions of the build material on which coalescing agent 604 has been delivered or has penetrated to heat up above the melting point of the build material and to coalesce. For example, the temperature of some or all of the layer 602b may achieve about 220 degrees Celsius. Upon cooling, the portions having coalescing agent 604 may coalesce may become solid and form part of the three-dimensional object being generated, as shown in FIG. 11d.

As discussed earlier, one such solidified portion 606 may have been generated in a previous iteration. The heat absorbed during the application of energy may propagate to the previously solidified portion 606 to cause part of portion 606 to heat up above its melting point. This effect helps creates a portion 608 that has strong interlayer bonding between adjacent layers of solidified build material, as shown in FIG. 11d.

After a layer of build material has been processed as described above in 506 to 512, new layers of build material may be provided on top of the previously processed layer of build material. In this way, the previously processed layer of build material acts as a support for a subsequent layer of build material. The process of 506 to 512 may then be repeated to generate a three-dimensional object layer by layer.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A system for processing slice data representing a slice of a three-dimensional object to be generated by an additive manufacturing system, the system comprising a processor to:
   when the additive manufacturing system is to generate the slice, perform a transformation on the slice data based on characteristic data of the additive manufacturing system, the slice data derived from three-dimensional object design data; and
   based on the transformed slice data, cause the additive manufacturing system to generate the slice;
   wherein the characteristic data is obtained from the manufacturer of the additive manufacturing system.

2. The system of claim 1, wherein the transformation is a geometrical transformation on the slice data to compensate for distortions introduced by the additive manufacturing system during the generation of the three-dimensional object.

3. The system of claim 1, wherein the transformation is to add sacrificial structure data to the slice data, the sacrificial structure data representing at least a part of a sacrificial structure that is not intended to form part of the three-dimensional object when generated.

4. The system of claim 1, wherein the transformation is to incorporate virtual object data into the slice data, the virtual object data based on object property data.

5. The system of claim 1, wherein the transformation is to combine the slice data representing the slice with other slice data representing another slice to generate combined slice data representing a combined slice.

6. The system of claim 1, wherein the transformation is to divide the slice data representing the slice to generate first and second divided slice data respectively representing a first and a second divided slice.

7. The system of claim 1, wherein the transformation is to modify a density of an agent defined by the slice data to be delivered on a layer of build material.

8. The system of claim 1, wherein the characteristic data is based on a measurement by a sensor in the additive manufacturing system, the measurement representing temperature of build material.

9. The system of claim 1, wherein the slice data is vector slice data.

10. The system of claim 1, wherein the slice data is any of: contone slice data, halftone slice data and mask slice data.

11. The system of claim 1, wherein the processor is programmed to perform:
   obtaining characteristic data representing a measurement made by a sensor in an additive manufacturing system;
   obtaining three-dimensional object design data representing a three-dimensional object to be generated by the additive manufacturing system;
   generating slice data representing a slice of the three-dimensional object based on the three-dimensional object design data; and
   when the additive manufacturing system is to generate the slice, transforming the slice data based on the characteristic data; and
   generate the slice using the additive manufacturing system.

12. The system of claim 1, further comprising a non-transitory computer readable storage medium including executable instructions that, when executed by the processor, cause the processor to:
   obtain slice data based on three-dimensional object design data, the slice data representing a slice of a three-dimensional object to be generated by an additive manufacturing system; and
   when the additive manufacturing system is to generate the slice, transform the slice data based on characteristics of the additive manufacturing system.

13. The system of claim 1, wherein the processor is to perform the transformation on the slice data based on characteristic data of the additive manufacturing system prior to generating the object.

14. The system of claim 1, wherein the characteristic data comprises characteristics of the build material used by the system.

15. The system of claim 14, wherein the characteristic data comprises any one of: age of the build material, humidity level of the build material, type of the build material, average particle size of the build material, and purity of the build material.

16. The system of claim 1, wherein the characteristic data comprises properties of an energy source of the system.

17. The system of claim 1, wherein the characteristic data comprises properties of a coalescing agent or coalescence modifier agent used by the system.

18. A system for processing slice data representing a slice of a three-dimensional object to be generated by an additive manufacturing system, the system comprising a processor to:
   when the additive manufacturing system is to generate the slice, perform a transformation on the slice data based on characteristic data of the additive manufacturing system, the slice data derived from three-dimensional object design data, and based on the transformed slice data, cause the additive manufacturing system to generate the slice;
   wherein the characteristic data comprises properties of a heater of the system.

19. A system for processing slice data representing a slice of a three-dimensional object to be generated by an additive manufacturing system, the system comprising a processor to:
   when the additive manufacturing system is to generate the slice, perform a transformation on the slice data based on characteristic data of the additive manufacturing system, the slice data derived from three-dimensional object design data; and
   based on the transformed slice data, cause the additive manufacturing system to generate the slice;
   wherein the transformation comprises adding a heat reservoir to be fabricated with the object.

* * * * *